United States Patent [19]
Hosterman et al.

[11] 3,801,051
[45] Apr. 2, 1974

[54] TOW PLATE
[75] Inventors: Thomas J. Hosterman, Fayetteville, N.C.; Frank S. Goodell, Upper Marlboro, Md.
[73] Assignee: The United States of America as represented by the Secretary of the Air Force, Washington, D.C.
[22] Filed: Jan. 10, 1973
[21] Appl. No.: 322,571

[52] U.S. Cl.......... 244/137 R, 244/151 B, 294/83 A
[51] Int. Cl............................................. B64d 17/64
[58] Field of Search....... 244/137, 151 B; 294/83 R, 294/83 A, 83 AB, 83 AE; 114/235 A

[56] References Cited
UNITED STATES PATENTS
3,670,999  6/1972  Leger............................. 244/137 R
3,425,739  2/1969  Frost et al......................... 294/83 R Primary Examiner—Trygve M. Blix
Assistant Examiner—Donald W. Underwood

[57] ABSTRACT

A tow plate for use in a cargo carrying aircraft having the capability of transferring the force of a drogue chute to an extraction chute(s) and directly to a load. The operation of the tow plate relies upon a solely mechanical clevis assembly for its force transfer operation. Furthermore, under emergency conditions the clevis assembly is capable of jettisoning the drogue chute before the force transfer has occurred. All action is highly reliable since it is based on a mechanical design.

9 Claims, 8 Drawing Figures

TOW PLATE

BACKGROUND OF THE INVENTION

This invention relates generally to tow plates, and more particularly to a tow plate which is utilized in aircraft with a cargo unloading system and is capable of transferring the force generated by a drogue chute to a main extraction chute or load, or releasing the drogue chute before force transfer has occurred.

It has long been a problem in the removal of cargo from cargo planes that the extraction parachute(s) would open at varying time intervals thus affecting the accuracy of the aerial delivery. To reduce the dispersion of the extraction parachute(s) opening time it is necessary to provide a positive force to pull the extraction parachute(s) from the aircraft and to pull the extraction parachute(s) from the parachute deployment bag. The drogue parachute provides the required force to accomplish these actions. A further problem is that the drogue parachute must be capable of being jettisoned (prior to force transfer) if the delivery is aborted because problems exist on the ground, due to a malfunctioning drogue parachute, or because other malfunctions occur in the aircraft.

Heretofore the extraction parachute(s) moved to the correct position behind the aircraft through a combination of gravity and the aircraft slipstream. Gravity was also employed to remove the extraction parachute(s) from the parachute deployment bag. To provide a mechanical force to position the extraction parachute(s) in the correct position behind the aircraft and to provide a force to pull the parachute(s) from the parachute deployment bag a drogue parachute is employed. Use of a drogue parachute requires a device to transfer the force of a deployed drogue parachute from the rear cargo delivery ramp of an aircraft to the extraction parachute(s) or light cargo load, and a device to jettison the drogue parachute prior to force transfer. Previous methods to accomplish these tasks incorporated two distinct devices: one for force transfer and one for drogue parachute jettisoning. The devices were totally dependent on electrical systems to activate a cutter and an explosive mechanism to obtain the desired actions. These devices were expensive, required a large amount of maintenance, and proved to be unreliable. Additionally, when either of the devices failed personnel and aircraft safety were jeopardized while the problem was being corrected.

SUMMARY OF THE INVENTION

The tow plate of the instant invention overcomes the problems set forth hereinabove. The tow plate of this invention is a solely mechanical device which, when secured on the rear cargo delivery ramp of an aircraft, will retain the drag force of a drogue parachute in tow and then, by remote command, transfer the force of the drogue to main extraction parachute(s) or directly to a light load, whichever the case may be. Additionally, the tow plate can release the drogue parachute at any time prior to force transfer, by remote command, without effecting a force transfer. This includes a no-load condition wherein the drogue parachute has not yet been deployed or inflated.

The tow plate is basically a shell housing and base plate cut from channel iron into which the functional mechanisms force multipliers, latches and clevis release have been fitted. Through external cables or electrical connections the primary force transfer action can be activated by remote means such as (a) mechanically open the latch by connecting the primary actuating cable to a winch, or (b) electrically activating a squib which will open the latch assembly. With either method a standby manually operated mechanical force transfer operation is provided. Emergency release of the drogue parachute is accomplished by manually releasing the gates which secure the end bolt (the bolt holding the drogue parachute lines) allowing the drogue parachute and the attached lines to separate from the tow plate. This action is entirely independent from the primary force transfer latch mechanism. Both manual operations are remotely controlled with the operator located in a position which will not jeopardize personnel safety.

It is therefore an object of this invention to provide a tow plate which produces a highly reliable force transfer operation.

It is a further object of this invention to provide a tow plate which utilizes a mechanical jettison system for release of the drogue chute and combines this operation into a single device with the force transfer operation.

It is still a further object of this invention to provide a tow plate which will not comprise personnel or aircraft safety.

It is another object of this invention to provide a tow plate which will be useable in all cargo aircraft capable of aerial delivery operations through rear opening doors, is economical to produce, simple in operation, and which utilizes conventional currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENT

Figure 1:
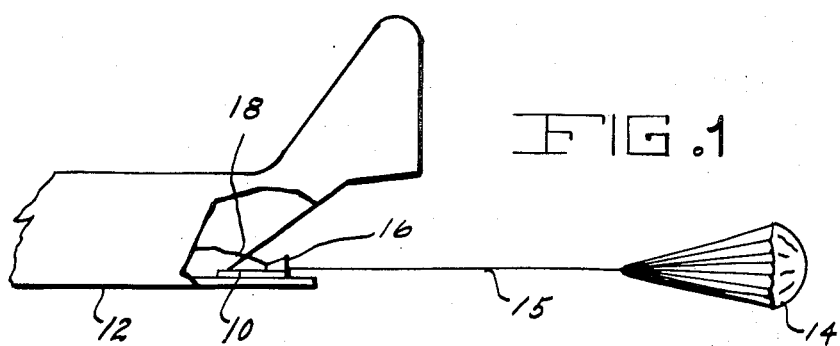
FIG. 1 is a fragmentary side elevation view of a cargo carrying aircraft shown with a drogue chute attached to the tow plate of this invention.
Figure 2:
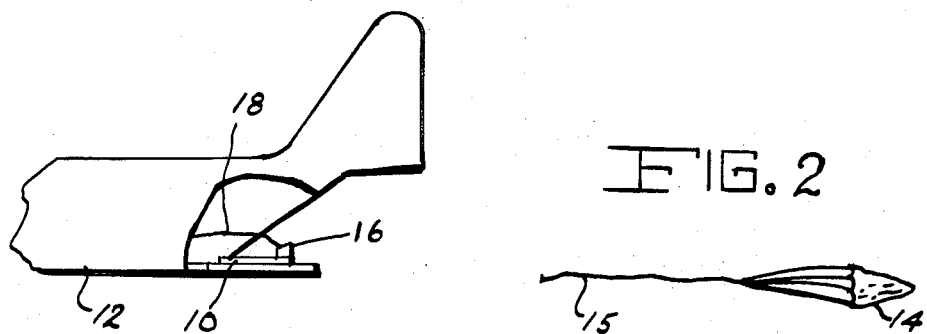
FIG. 2 is a fragmentary side elevational view of a cargo carrying aircraft shown with the drogue chute jettisoned from the tow plate of this invention.
Figure 3:
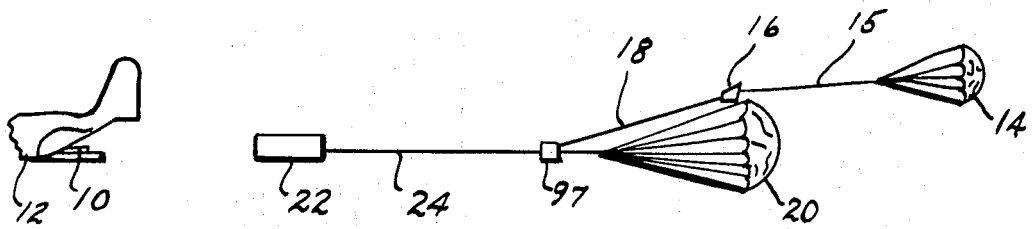
FIG. 3 is a fragmentary side elevational view of a cargo carrying aircraft shown with the extraction chute and drogue chute after force transfer has been accomplished by the tow plate of this invention.

Reference is now made to FIGS. 1–3 of the drawing which show the tow plate 10 of this invention mounted within the rear portion of any conventional aerial delivery capable cargo carrying aircraft 12. FIG. 1 of the drawing further illustrates a drogue chute 14 secured by any suitable securing means such as line 15 to a clevis assembly 16. Assembly 16 is releasably mounted within tow plate 10. Line 18 secures the drogue chute clevis assembly 16 to the extraction chute(s) clevis assembly 97. Any suitable load(s) 22 is also secured to extraction chute(s) clevis assembly 97 by line 24, and this load is most clearly shown in FIG. 3.

If for some reason the delivery is aborted prior to force transfer it is possible with the tow plate 10 of this invention to jettison drogue chute 14 as shown in FIG. 2 in a manner to be explained in detail hereinbelow. If there is no reason to abort the delivery, the drogue chute 14 by means of clevis assembly 16 transfers its force to main chute(s) 20 thereby extracting load 22 as shown in FIG. 3. It should be noted that more than one load 22 may be withdrawn from aircraft 12 with a single set of parachutes. Furthermore, a plurality of main extraction chutes 20 may be utilized with this invention, or if the load is of light weight the drogue chute 14 may be secured directly to the load 20 through the clevis 16 and in that instance take the place of extraction chute 20.

Figure 4:
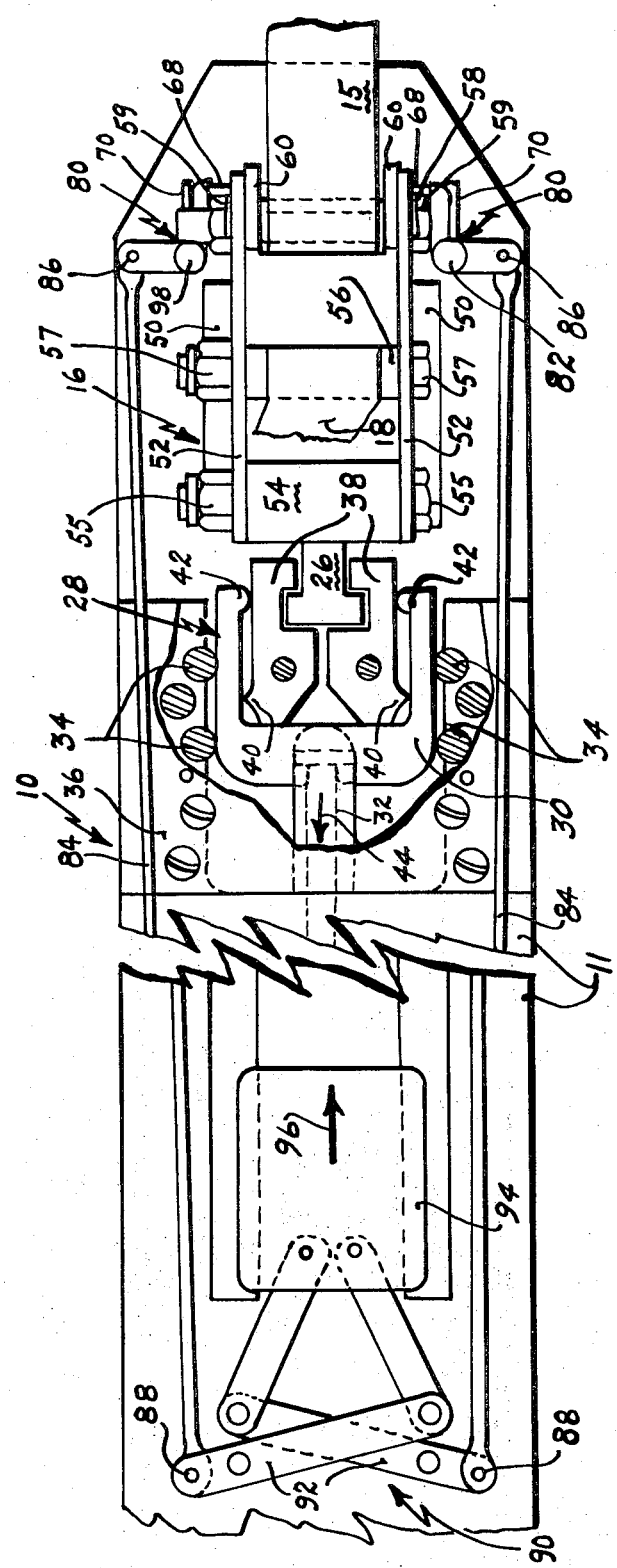
FIG. 4 is a fragmentary plan view of the tow plate of this invention with emphasis on the clevis assembly.

FIG. 4 shows in detail the tow plate 10 as well as the clevis assembly 16 associated therewith. Tow plate 10 is made of a base plate 11 cut from any suitable channel iron, with clevis assembly 16 releasably, slideably secured therein. Clevis assembly 16 has a T-bar 26 secured at one end thereof for releasably engaging a locking mechanism 28 mounted on tow plate 10. Locking mechanism 28 allows for the release of clevis assembly 16 when the load transfer from drogue chute 14 to main extraction chute (or light load) 20 is to take place as shown in FIG. 3.

The locking mechanism 28 is made up of a U-shaped member 30 slideably mounted on bearings 34 located within housing 36. A connecting means such as rod 32 affixes member 30 to a mechanical or manual actuating means (not shown). In addition, rod 32 serves as a piston if member 30 is moved by an electrically actuated squib. By locating the actuating means distant from the clevis assembly 16 the safety of personnel who are within handling distance of clevis assembly 16 is insured. Pivotally mounted within housing 36 are a pair of locking members 38 of a configuration capable of engaging T-bar 26 on clevis assembly 16. Locking members 38 further contain thereon suitable caming means 40 which are capable of engaging the rollers 42 on U-shaped member 30. In operation, upon actuation, rod 32 withdraws U-shaped member 30 in the direction of arrow 44 which in turn causes the rollers 42 to ride upon cams 40 insuring the pivotal action of locking members 38 thereby releasing T-bar 26 of clevis assembly 16.

Figure 5:
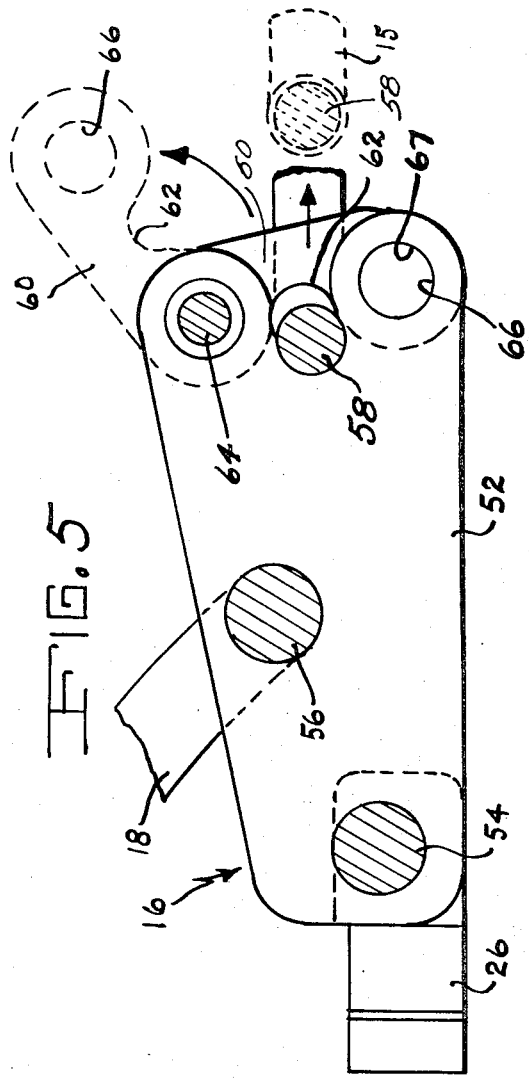
FIG. 5 is a side elevational view of the clevis assembly of the tow plate of this invention wherein phantom lines represent the jettison position of the clevis.
Figure 6:
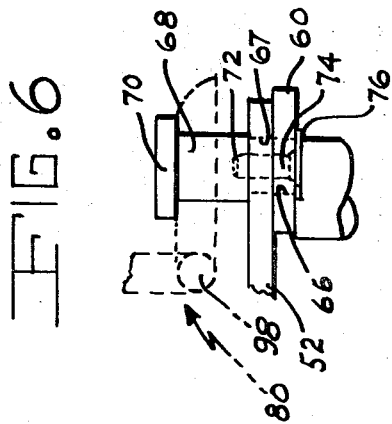
FIG. 6 is a plan view showing a segment of the clevis assembly of the tow plate of this invention.
Figure 7B:
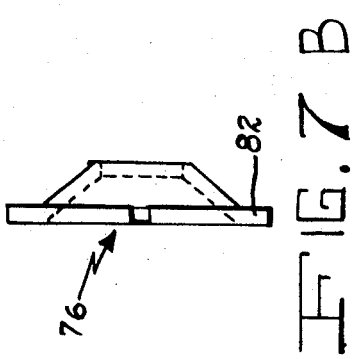
FIG. 7A and 7B are a plan view and side elevational view, respectively, of the washer utilized in the clevis assembly of the tow plate of this invention.
Figure 7A:
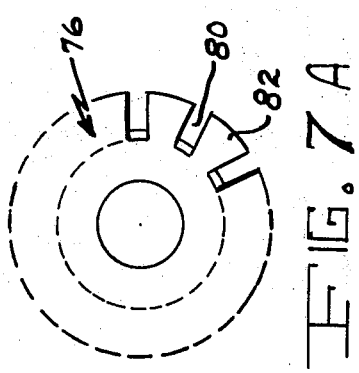

Reference is now made to FIGS. 4, 5 and 6 which show in detail the clevis assembly 16. Assembly 16 is mounted within tow plate 10 on a pair of rails 50 which allows for the slideable withdrawal of assembly 16 from tow plate 10. A pair of side members 52 best shown in FIGS. 4 and 5 form the supporting structure of clevis assembly 16 through which a plurality of bolts 54, 56 and 58 secured by nuts 55, 57 and 59, respectively, are located. Bolt 54 mounts T-bar 26 to clevis assembly 16 while bolt 56 allows for the securing of line 18 thereto. A U-shaped catch 60 is pivotally secured at one end thereof to each side member 52 of clevis assembly 16 by rivet 64. Each catch 60 has an indentation 62 in the central portion thereof which allows for the passing through of bolt 58. Line 15 of drogue chute 14 is secured to bolt 58 as shown in FIGS. 4 and 5 of the drawing. The other end of each catch 60 as shown in FIGS. 5 and 6 has an aperture 66 there through which is aligned with apertures 67 in side members 52. These apertures are utilized in conjunction with a pair of pins 68 whose operation will be described hereinbelow with reference to FIGS. 4 through 7.

A pair of locking pins 68 (one of which being shown in FIG. 6) are utilized with the clevis assembly 16. However, in the following description only one such pin 68 will be described since both are identical in nature. Pin 68 has a head 70 at one end thereof and an opening 72 at the other end which allows for the insertion therein of a screw 74. Screw 74 holds a washer 76 against catch 60. Pin 68 passes through apertures 67 and 66 of side element 52 and catch 60, respectively. Washer 76 (shown in FIGS. 7A and 7B) is of a diameter larger than the diameter of apertures 66 and 67 so as to securely hold pin 68 and catch 60 in place. A plurality of spaced slots 80 form a plurality of tabs 82 in washer 76. The number of slots 80 are determined by the amount that the washer must be collapsed to be pulled through apertures 66 and 67. The slotted washers 76 must be strong enough not to pass through apertures 66 and 67 under normal conditions but must be weak enough for the bending of tabs 82 to take place upon the removal of pin 68 in a manner to be described hereinbelow.

As best shown in FIGS. 4 and 6 a pair of bell cranks 80, identical in nature, engage underneath the heads 70 of pins 68. Again since both bellcranks 80 are of the same construction, the following description will encompass only one bellcrank 80 and one pin 68. Bellcrank 80 is pivotally secured to tow plate 10 by pin 98. A lever arm 84 engages bellcrank 80 at one end 86 thereof and at the other end 88 engages a force multiplying lever arrangement 90. This arrangement 90 is made of a plurality of bars 92 pivotally secured to tow plate 10 as well as being pivotally secured to a slideable block 94. Block 94 is connected in any suitable manner to an actuating means (not shown). Upon movement of block 94 in the direction of arrow 96, withdrawal of lever arm 84 causes the pivotal movement of bellcrank 80. This action of bellcrank 80 is of sufficient force to remove pins 68 and thereby collapse washer 76 as it passes through apertures 66 and 67. Once either washer 76 passes through aperture 66 in each catch 60, catch 60 is capable of pivoting about rivet 64 allowing for the release of bolt 58 along with drogue chute line 15 as shown in FIG. 5.

It is therefore clearly evident that the tow plate 10 of this invention relies upon a completely mechanical system of force transfer. In operation it is possible by the release of locking mechanism 28 to release clevis assembly 16 and therefore transfer the force generated by the drogue chute from the aircraft to the extraction chute(s), or a light load thus pulling the load from the aircraft. Furthermore, it is also possible under emergency conditions, by the movement of bellcrank 80 to positively jettison only the drogue chute 14 without clevis assembly 16. In this instance load 22 remains in the aircraft 12 as shown in FIG. 2.

Although this invention has been described with reference to a particular embodiment it will be understood to those skilled in the art that this invention is also capable of a variety of alternate embodiments within the spirit and scope of the appended claims.

We claim:

1. A tow plate for use in a cargo carrying aircraft comprising an elongated body, a clevis assembly releasably secured within said body, a locking mechanism mounted within said body for releasably engaging said clevis assembly, said clevis assembly being formed of a supporting structure, a catch pivotally secured at one end thereof to said supporting structure for releasably securing a first line, means secured to the other end of said catch for releasably securing said other end of said catch to said supporting structure and means fixedly secured within said clevis assembly for securing a second line thereto, whereby upon unlocking of said locking mechanism a force exerted on said first line can be transferred to said second line or upon release of said other end of said catch said first line can be jettisoned without transferring the force to said second line.

2. A tow plate as defined in claim 1 wherein said means for releasably securing said other end of said catch to said supporting structure comprises a pin having a head on one end thereof, a serrated washer and a screw fixedly securing said washer to the other end of said pin.

3. A tow plate as defined in claim 2 wherein said supporting structure further has an aperture therein of predetermined diameter, the other end of said catch having an aperture therein aligned with said aperture in said supporting structure and being no larger than said predetermined diameter and said washer being of a diameter greater than said predetermined size.

4. A tow plate as defined in claim 3 further comprising a means for removing said pin from said supporting structure thereby causing the release of said one end of said catch.

5. A tow plate as defined in claim 4 wherein said removing means is a bellcrank having one end thereof engaging the head of said pin.

6. A tow plate as defined in claim 5 wherein said serrated washer collapses under the force of said removing means and passes through said apertures in said catch and said supporting structure.

7. A tow plate as defined in claim 6 wherein a bolt is secured to said first line, said bolt being releasably held within said clevis assembly by said catch.

8. A tow plate as defined in claim 7 further comprising a rail for slideably mounting said clevis assembly thereon.

9. A tow plate as defined in claim 8 wherein said locking mechanism has a pair of elements pivotally secured therein which engage said clevis assembly and a U-shaped member for causing the pivotal movement of said elements.

* * * * *